United States Patent [19]

Shu

[11] Patent Number: 4,903,768
[45] Date of Patent: Feb. 27, 1990

[54] METHOD FOR PROFILE CONTROL OF ENHANCED OIL RECOVERY

[75] Inventor: Paul Shu, West Windsor, N.J.

[73] Assignee: Mobil Oil Corporation, New York, N.Y.

[21] Appl. No.: 292,796

[22] Filed: Jan. 3, 1989

[51] Int. Cl.$^4$ ............... E21B 33/138; E21B 43/22; E21B 43/24

[52] U.S. Cl. ............... 166/270; 166/272; 166/273; 166/288; 166/295

[58] Field of Search ............ 166/270, 272, 273, 274, 166/288, 294, 295, 300, 302, 303, 263; 523/130

[56] References Cited

U.S. PATENT DOCUMENTS

| | | | |
|---|---|---|---|
| 3,557,562 | 1/1971 | McLaughlin, Jr. et al. | |
| 4,157,322 | 6/1979 | Colegrove | 166/300 |
| 4,440,228 | 4/1984 | Swanson | 166/274 |
| 4,479,894 | 10/1984 | Chen et al. | 252/8.55 X |
| 4,513,821 | 4/1985 | Shu | 166/273 |
| 4,565,249 | 1/1986 | Pebdani et al. | 166/303 |
| 4,640,357 | 2/1987 | Jones | 166/273 |
| 4,658,898 | 4/1987 | Paul et al. | 166/270 |
| 4,665,986 | 5/1987 | Sandiford | 166/270 X |
| 4,673,038 | 6/1987 | Sandiford et al. | 166/295 |
| 4,716,966 | 1/1988 | Shu | 166/295 |
| 4,776,398 | 10/1988 | Chu et al. | 166/274 |
| 4,782,901 | 11/1988 | Phelps et al. | 166/295 X |
| 4,796,700 | 1/1989 | Sandiford et al. | 166/295 X |
| 4,799,548 | 1/1989 | Mumallah et al. | 166/272 X |
| 4,804,043 | 2/1989 | Shu et al. | 166/295 X |

Primary Examiner—George A. Suchfield
Attorney, Agent, or Firm—Alexander J. McKillop; Charles J. Speciale; Charles A. Malone

[57] ABSTRACT

A process for profile control in a high permeability zone of a formation. A water flooding or carbon dioxide stimulation enhanced oil recovery (EOR) process is conducted in an an oil-containing formation having a high permeability zone. After breakthrough occurs, the EOR process is ceased. The high permeability zone is heated to a temperature of 300° F. or higher by steam injection. Subsequently, steam injection is ceased and a temperature activated mixture is injected into the high permeability zone where it forms a solid gel. Thereafter, an EOR process can be used to remove hydrocarbons from a low permeability zone.

10 Claims, 2 Drawing Sheets

4,903,768

METHOD FOR PROFILE CONTROL OF ENHANCED OIL RECOVERY

RELATED APPLICATIONS

This application is related to copending application Ser. No. 068,292, now U.S. Pat. No. 4,804,043 filed July 1, 1987. It is also related to Ser. No. 292,799. Additionally, it is related to Ser. No. 292,795.

FIELD OF THE INVENTION

This invention relates to profile control in enhanced oil recovery so that increased amounts of hydrocarbonaceous fluids can be obtained from a low permeability zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, and thermal recovery.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the underswept low permeability, oil rich zones. Among the polymers examined for improving waterflood conformance are metal cross-linked polysaccharides, metal cross-linked polyacrylamides, and organic-crosslinked polyacrylamides.

Polymeric gels are disclosed in several U.S. patents. Among these in U.S. Pat. No. 4,157,322 which issued to Colegrove on June 5, 1979. This gel is formed from water, a polysaccharide polymer, an acid generating salt and a melamine resin. A polymeric gel is disclosed in U.S. Pat. No. 4,658,898 which issued to Paul et al. on Apr. 21, 1987. This patent discloses an aqueous solution of heteropolysaccharide S-130 combined with cations of basic organic compounds which cations contained at least two positively charged centers. U.S. Pat. No. 4,716,966, issued to Shu on Jan. 5, 1988, discloses a gel formed by amino resins such as melamine formaldehyde which modify biopolymers in combination with transitional metal ions. These patents are hereby incorporated by reference herein.

Basic to the problem of diverting displacing fluid with polymeric gels is the necessity of placing the polymer where it is needed, i.e., in the high permeability zone. This is possible when xanthan biopolymers are cross-linked with metal ions such as $Cr^{+3}$ above ground to give gels. These gels are shear stable and shear thinning. They can be injected into the formation where they can reheal. Due to the gel's reological properties, they will of necessity go into high permeability zones. However, many other gel systems are formed in-situ. One system disclosed in U.S. Pat. No. 3,557,562 contains acrylamide monomer, methylene-bis-acrylamide as an organic cross-linker, and a free radical initiator. This system undergoes polymerization in the formation to give a polyacrylamide cross-linked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of cross-linking hydrolyzed polyacrylamide. Even though the polyacrylamide solution has a viscosity greater than water, it is not capable of showing the selectivity that a gel can. Thus, polyacrylamides cross-linked with chromium in-situ can also go into low permeability zones. It is not useful to cross-link polyacrylamides above ground and inject them as gels, because polyacrylamide gels undergo shear degradation. There are very few gels that are selective and thermally stable.

Therefore, what is needed is a method where a gel forms selectively in-situ in a high permeabilty zone of a formation only when said zone has been previously heated subsequent to utilization of an enhanced oil recovery process.

SUMMARY

This invention is directed to a method for profile control in a heated high permeability zone of an oil-containing formation. In one embodiment of this invention, a water flood or carbon dioxide enhanced oil recovery (EOR) process is conducted in a formation until "breakthrough" occurs. When "breakthrough" occurs it becomes uneconomical to continue producing oil from the formation because of the high ratio of drive fluids being produced to the ratio of oil. The drive fluids produced will depend on the EOR process utilized. Where a water flood is utilized, the produced drive fluid will be water. If the carbon dioxide EOR process is used the produced drive fluid will be cabon dioxide.

When these EOR processes are utilized, in the absence of an override condition, a drive fluid will preferentially tend to flow into a high permeability zone and remove oil or hydrocarbons therefrom. Once the oil has been depleted from the high permeability zone of the formation often oil remains in a low permeability zone of the formation. To recover this oil from the low permeabilty zone once breakthrough has occurred, the EOR process is ceased. After cessation of the EOR process the high permeability zone is heated with steam to a temperature greater than about 300° F.

Once the high permeability zone has been heated to a temperature greater than 300° F., steam injection is stopped. Thereafter, a heat activated gellable mixture is injected into the formation. When the gellable mixture has travelled the desired distance into the formation, injection of said gellable mixture is ceased. Heat emitted from the more permeable zone activates the gellable mixture upon reaching a temperature of above 300° thereby causing it to form a solid gel and close pores in the more permeable zone.

Gellable aqueous compositions which can form a solid gel upon reaching a temperature above 300° F. are comprised of selected water dispersible polymers, phenolic compounds, and aldehyde producing compounds. Polymers which are utilized herein are selected from a member of the group consisting of polyvinyl alcohol, polyvinyl alcohol copolymers, polyacrylamide, polyvinyl amine, sulfonated polyvinyl alcohol, and poly (acrylamide-co-acrylamido-2-methylpropane sulfonate). Phenolic compounds which can be used include phenol, catechol, resorcinol, phloroglucinol, 4,4'-diphenol, 1,3-dihyroxynaphthalene, and related similar compounds. Aldehyde producing compounds which can be utilized herein upon reaching a temperature above about 300° F. include trioxane and paraformaldehyde, tetraoxane.

It is therefore an object of this invention to provide for a method for delivering a temperature activated gellable composition into a heated high permeability zone having a temperature sufficient to activate said composition and selectively form a solid gel therein.

It is another object of this invention to provide a method for delivering a temperature activated gellable composition into a formation's heated high permeability zone having a temperature above about 300° F. and thereafter form a solid gel therein.

It is yet another object of this invention to provide a method for using a composition which avoids forming a solid gel in a unheated zone of lesser permeability or a low temperature zone of a formation.

It is another further object of this invention to provide a method for using a composition that will minimize gel damage to a zone of lower permeability while closing pores in a higher permeability zone having a temperature above about 300° F.

It is still another object of this invention to provide a method injecting a temperature activated gellable composition into a producer well and cause a solid gel to form so as to divert sweep fluids into an unswept formation zone.

It is a still yet further object of this invention to provide a method for using a composition which will increase the efficiency of a drive fluid through a formation thereby increasing the yield of hydrocarbonaceous fluids therefrom.

DESCRIPTION OF THE PREFERRED EMBODIMENTS

In the practice of this invention, an enhanced oil recovery (EOR) process employing profile control is used to recover hydrocarbonaceous fluids from a formation. A waterflooding process as discussed in U.S. Pat. No. 4,479,894 is an example of a waterflooding process which can be used herein. Carbon dioxide EOR processes can also be utilized. Examples of the processes which can be used are discussed in U.S. Pat Nos. 4,565,249 and 4,513,821. All of the aforementioned patents are incorporated by reference herein. Once a drive fluid, either water or carbon dioxide has broken through into a production well, the EOR process being used will be stopped.

Figure 1:
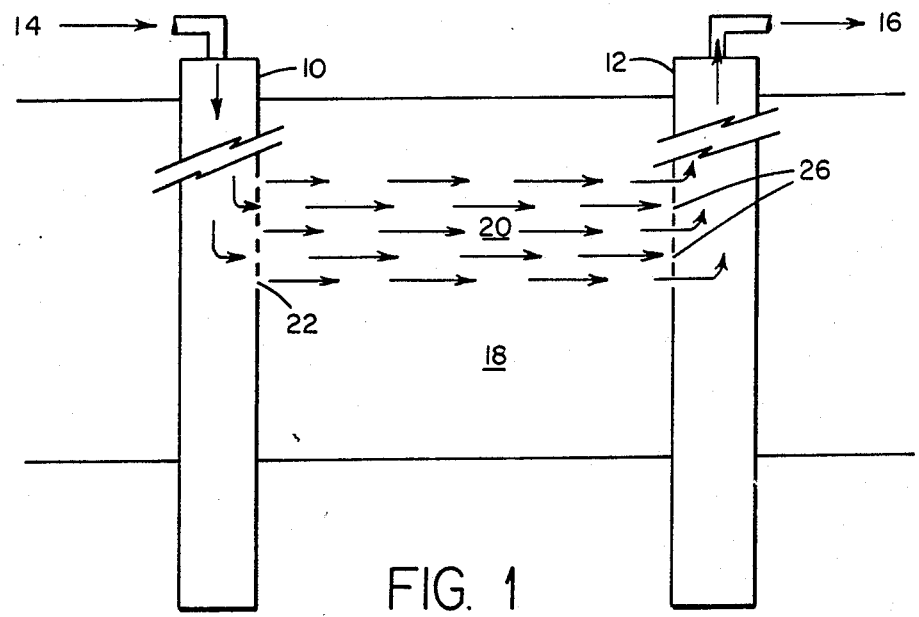
FIG. 1 is a diagrammatic plan view of a formation where steam has passed through a high permeability zone or area into a production well.
Figure 3:
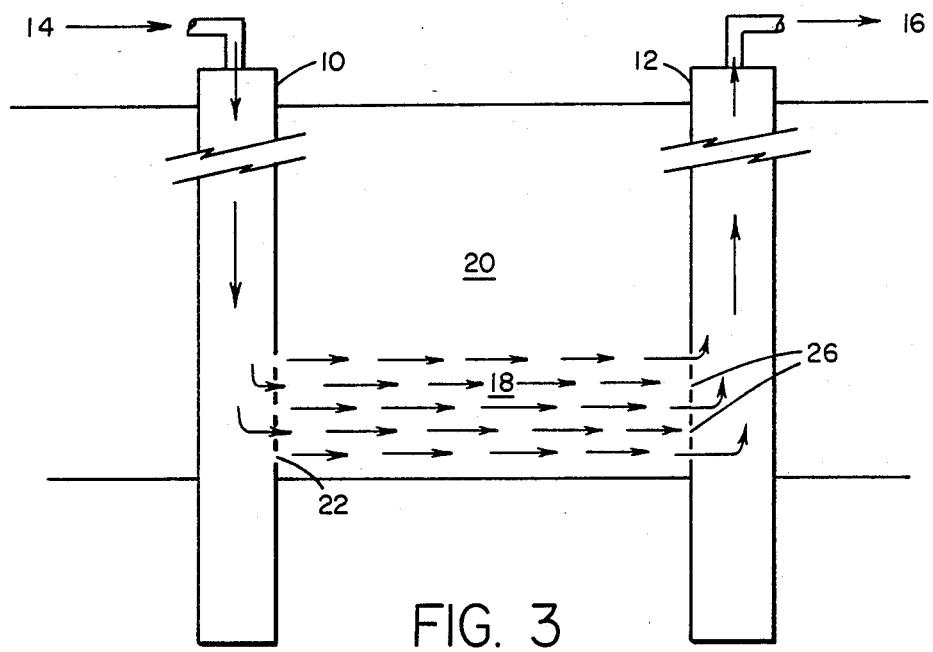
FIG. 3 is a diagrammatic plan view where the high permeability zone has been closed with a temperature activated gel while an EOR flooding medium is passing through a low permeability zone or area.
Figure 2:
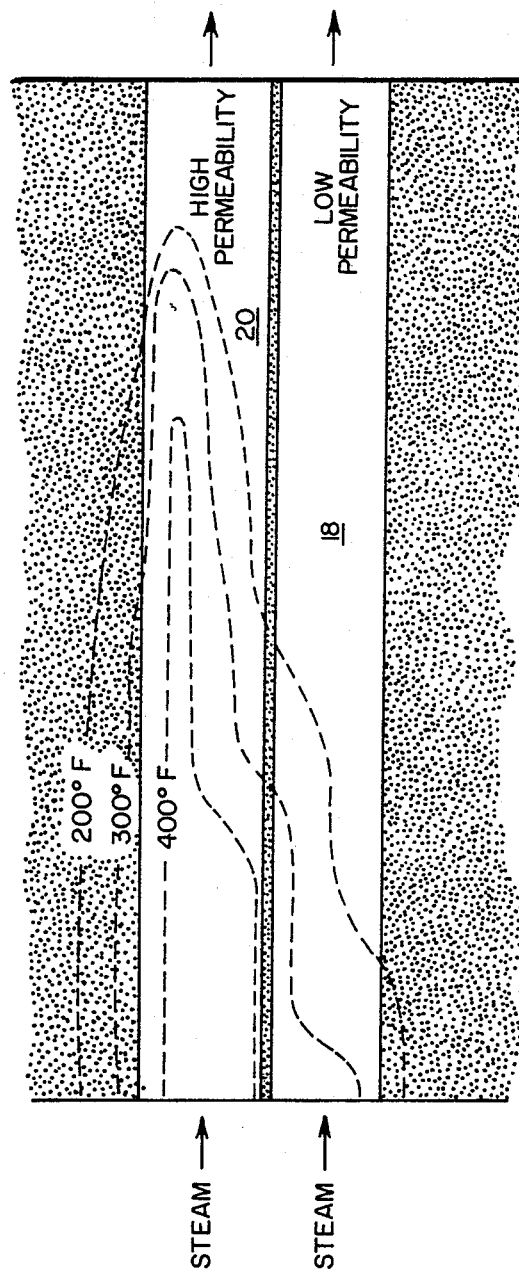
FIG. 2 is a schematic representation which illustrates temperature distribution into high and low permeability zones of a formation during steam flooding.

After cessation of the EOR process, steam will be injected into the formation. As is shown in FIG. 1, steam enters conduit 14 of injection well 10. Afterwards, steam exits injection well 10 via perforations 22 and enters high permeability zone 20. Steam and any hydrocarbons obtained from high permeability zone 20 exit through production well 12 via perforations 26. Thereafter, steam and hydrocarbonaceous fluids exit production well 12 via conduit 16. During steam injection, the formation is heated. While being heated, a temperature contour is developed in the steam flooded formation. Thus, the high permeability "thief" zones swept by steam have the highest temperatures in the formation while other areas not contacted by steam will have the lowest. This concept is illustrated in FIG. 2. Once high permeability zone 20 has been heated to a temperature in excess of 300° F. steam injection is ceased. Thereafter, high permeability zone 20 is closed by a temperature activated gel so that hydrocarbonaceous fluids can be removed from low permeability zone 18. Closing of the high permeability zone is depicted in FIG. 3. In the practice of this invention, an aqueous gellable temperature activated mixture is injected via conduit 14 into injection well 10 where it enters high permeablity zone 20. When the gellable temperature activated mixture comes into contact with heated high permeability zone 20, components in the aqueous gellable mixture form a solid gel which blocks pores in high permeability zone 20. Due to the high porosity of high permeability zone 20, the aqueous gellable mixture preferentially enters high permeability zone 20.

Once in high permeability zone 20, the aqueous gellable mixture is allowed sufficient time to form a solid gel. Generally the solid gel will form at a temperature greater than about 300° F. in about from 1 to about 20 days. Although some of the aqueous gellable mixture may enter low permeability zone 18, it will not form a gel in that portion of low permeability zone 18 where the temperature is too low. Any gellable mixture which enters low permeability zone 18 where the temperature is too low for gelation can be removed therefrom by pumping a spacer volume of cold water therethrough so as to make the mixture ungellable. An additional benefit of the ungelled aqueous mixture is that being viscous it can act as a mobility control agent so as to facilitate the removal of hydrocarbonaceous fluids from low permeability zone 18. Alternatively, any ungelled materials can be pumped out or produced back to the surface if a producer well is treated. When the gellable compositions are used prior to a water-alternating-gas (WAG) process, the ungelled material need not be pumped or removed from the formation since it can advantageously act as a mobility control agent. A WAG process is discussed in U.S. Pat. No. 4,640,357 which is incorporated by reference herein in its entirety.

Aqueous gellable temperature activated compostions which can be utilized herein are comprised of a polymer, a phenolic compound, and an aldehyde. Polymers utilized herein are water dispersible polymers. The term "polymer" is employed generically to include both homopolymers and copolymers. The term "water-dispersible polymers" is used generically to include those polymers which are truly water-soluble and those polymers which are dispersible in water or in other aqueous medium to form stable colloidal suspensions which can be gelled. Also, the term "aqueous dispersion" is utilized generically to include both true solutions and stable colloidal suspensions of components of the composition of this invention which can be gelled as will be described herein. Water-dispersible polymers which are used herein are selected from a member of the group consisting of polyvinyl alcohol, polyacrylamide, sulfonated polyvinyl alcohol, and poly (acrylamide-co-acrylamido-2-methylpropane sulfonate). Polyvinyl alcohol (PVA) at various degrees of hydrolysis are useful. Other polymers containing OH, $NH_2$, $CONH_2$, and SH are also useful. Polyvinyl amine, and copolymers containing the previously mentioned functional groups are useful. Any of these water-dispersible polymers are placed into an aqueous mixture in amount of from about 0.5 to about 10.0 wt. %. The aqueous medium can comprise fresh water, brackish water, or sea water, and mixtures thereof. Polyacrylamide and poly(2-acrylamido-2-methylpropane sulfonate) are discussed in U.S. Pat. No. 4,440,228 which issued on Apr. 3, 1984 to Swanson. This patent is hereby incorporated herein in its entirety.

After placing the selected water-dispersible polymer into the aqueous medium, a phenolic compound is added to the mixture. Phenolic compounds which can be used herein include phenol, naphthol, catechol, resorcinol, phloroglucinol, 4,4'-diphenol, 1,3-dihydroxynaphthalene, and related similar compounds. The amount of phenolic compound utilized should be in excess of 0.5 wt. % or higher. The amount of phenolic compound used herein should be sufficient to impart the desired gelation effect within the desired time period.

Once the phenolic compound has been added, a water-dispersible aldehyde producing compound is mixed into the aqueous mixture. Representative examples of such aldehyde producing compounds include trioxane, tetraoxane, polyoxymethylene, and other aldehyde precursors. The term "water-dispersible" is employed generically to include both those aldehydes which are truly water-soluble and those aldehydes producing compounds of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be in an amount sufficient to cause gelation of an aqueous dispersion of a polymer, the aldehyde, and the phenolic compound. As a general guide, the amount of aldehyde used in preparing the gel compositions herein will be in the range of from about 0.5 to about 10.0, preferably 1.0 to about 5.0 wt. % based on the total weight of the composition.

A preferred temperature activated gellable mixture comprises polyvinyl alcohol, phenol, and trioxane. The effect of temperature on said mixture is shown in Table 1. When exposed to a formation having a temperature of about 300° to about 350° F. or higher, a firm gel will form in about 1 day to about 15 days when 0.05 to about 0.5 wt. % of sodium hydroxide is utilized as is shown in Table 2. Polyvinyl alcohol is used in amounts of about 0.5 to about 5.0 wt. %. Phenol is used in about 0.5 to about 5.0 wt. % or higher. The phenol to trioxane ratio is about 0.5 to 1.5, preferably about 1.0. The polyvinyl alcohol/phenol weight ratio is from about 0.2 to about 2. Of course, a lower ratio is used when other higher molecular weight polymers are utilized. The total concentration of polymer, phenol, and trioxane is directly proportional to the gel strength. A rigid gel is formed which is proportional to the total materials content.

TABLE 1

| Temperature Sensitivity of PVA/Phenol/Trioxane* Gelation | | | | | |
|---|---|---|---|---|---|
| Temp, °F. | 200 | 300 | 350 | 400 | 450 |
| Gel Time, days | no gel | no gel | 1 | 1 | 1 |

*2.5% PVA, 4% phenol, 3% trioxane

TABLE 2

| Effect of NaOH Concentration on Gel* Time | | | | |
|---|---|---|---|---|
| NaOH, % | 300° F. | 350° F. | 400° F. | 450° F. |
| 0.05 | No gel | 15 days | 8–9 days | 4 days |
| 0.1 | " | 15 days | 5–7 days | 2 days |
| 0.2 | " | 12 days | 2 days | 1 day |
| 0.3 | " | 9 days | 1 day | 1 day |
| 0.5 | " | 6 days | 1 day | 1 day |

*2.5% PVA, 4% phenol, 3% trioxane

As mentioned above, prior to injecting the aqueous temperature activated gellable mixture, the formation is heated with the steam. A formation temperature of about 300° F. or greater is preferred. The method of this invention is particularly beneficial when used to close an area in or substantially near either the injection well or the production well after heating to the desired temperature following an EOR process. This method is particularly beneficial when it is desired to close the heated area around a production well which has suffered a premature fluid drive breakthrough. Having heated the formation to the desired temperature, the temperature activated gellable mixture is injected into the production well for a time sufficient to enter the areas which comprise the premature breakthrough zone. Afterwards the gellable mixture in that zone is allowed to form a solid gel. Once the solid gel is formed, an enhanced oil recovery method is utilized and the drive fluid can be injected either through the injection well or the production well to recover hydrocarbonaceous fluids from a less permeable zone of the formation.

As demonstrated, the novelty of this invention is that the cross-linking reaction is activated at elevated temperatures greater than about 300° F. The cross-linking reaction is not activated at temperatures under 300° F. At high temperatures, trioxane, a cyclic dimer of formaldehyde decomposes to yield formaldehyde which in turn reacts with phenol to form phenolic resin, the gelant, in situ. Phenolic resin then gels the polymer.

Where it is desired to obtain increased sweep efficiency, gels of this invention can be used to plug a previously sweep portion of a formation which has been heated to a temperature of in excess of 300° F. Said gels can be directed to areas of increased porosity. Once a solid gel has formed, hydrocarbonaceous fluids can be removed from an area of lesser permeability zone by utilization in any of the below methods.

After plugging the more permeable zones of a heated formation with the novel gels of this invention, a waterflooding process can be commenced. U.S. Pat. No. 4,479,894, issued to Chen et al., describes one such waterflooding process. This patent is hereby incorporated by reference in its entirety.

Once the high permeability zone has been closed, a cyclic carbon dioxide steam stimulation process can be used to recover heavy oil from a lower permeability zone. Cyclic carbon dioxide steam stimulation is commenced after plugging the more permeable zones of the reservoir with the novel temperature activated gels of this invention. A suitable process is described in U.S.

Pat. No. 4,565,249 which issued to Pebdani et al. This patent is hereby incorporated by reference in its entirety. Hydrocarbons can be removed from a low permeability zone after closing the high permeability zone by utilization of a carbon dioxide process which lowers the carbon dioxide minimum miscibility pressure ("MMP"). Carbon dioxide MMP in an oil recover process is described in U.S. Pat. No. 4,513,821 issued to Shu which patent is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for profile control in ehanced oil-recovery in a high permeability zone of a formation comprising:
   (a) conducting an enhanced oil recovery process in a formation which process removes hydrocarbons from a high permeability zone until breakthrough occurs;
   (b) ceasing use of the enhanced oil recovery process after breakthrough occurs;
   (c) injecting steam into the formation and heating the high permeability zone to a temperature sufficient to cause a temperature activated gellable mixture to form a solid gel;
   (d) terminating steam injection into the formation;
   (e) injecting into said formation a temperature activated gellable mixture which mixture enters said heated high permeability zone; and
   (f) activating said mixture by the temperature in the heated zone which temperature is sufficient to cause a solid gel to form and close pores in said heated high permeability zone.

2. The method as recited in claim 1 where a spacer volume of cold water is pumped into the formation after step (f) which keeps any ungelled mixture from forming a solid gel.

3. The method as recited in claim 1 where a water flooding or a carbon dioxide stimulation enhanced oil recovery process is commenced after step (f) and hydrocarbons are removed from a low permeability zone.

4. The method as recited in claim 1 where the gellable mixture comprises water, polyvinyl alcohol, phenol, and trioxane which forms a solid gel at a temperature of about 300° F. or greater.

5. The method as recited in claim 1 where the gellable mixture comprises water, polyvinyl alcohol, phenol, and trioxane where the polyvinyl alcohol to phenol ratio is about 0.2 to about 2.0, the phenol to trioxane ratio is about 0.5 to about 1.5, and a gel forms in from about 1 to about 15 days with the addition of about 0.25 to about 0.5 wt. % of sodium hydroxide.

6. The method as recited in claim 1 where after step (f) a drive fluid is injected into a low temperature zone of lesser permeability in said formation where the gellable mixture does not form a gel but serves as a mobility control agent to enhance the recovery of hydrocarbonaceous fluids.

7. The method as recited in claim 1 where said gellable mixture comprises a polymer such as polyacrylamide, sulfonated polyvinyl alcohol, poly (acrylamide-co-acrylamido-2-methylpropane sulfonate) cross-linked with a phenolic resin formed in situ.

8. The method as recited in claim 1 where said gellable mixture comprises a polymer such as polyacrylamide, sulfonated polyvinyl alcohol, poly (acrylamide-co-acrylamido-2-methylpropane sulfonate) cross-linked with a phenolic resin which is formed in situ.

9. A method for profile control in enhanced oil-recovery in a high permeability zone of a formation comprising:
   (a) conducting an enhanced oil recovery process in a formation which process removes hydrocarbons from a high permeability zone until breakthrough occurs;
   (b) ceasing use of the enhanced oil recovery process after breakthrough occurs;
   (c) injecting steam into the formation and heating the high permeability zone to a temperature sufficient to cause a temperature activated gellable mixture to form a solid gel;
   (d) ceasing injection of steam into the formation;
   (e) injecting a temperature activated gellable aqueous mixture into the formation which mixture comprises water, polyvinyl alcohol, phenol and trioxane in an amount sufficient to form a phenolic resin in situ and cross-link with said alcohol at a temperature greater than about 300° F.
   (f) forming a solid gel in a high permeability zone of said formation having a temperature greater than about 300° F.; and
   (g) initiating a water flooding or a carbon dioxide stimulation enhanced oil recovery process and recovering hydrocarbons from a low permeability zone.

10. The method as recited in claim 9 where the polyvinyl alcohol to phenol ratio is about 0.2 to about 2.0, the phenol to trioxane ratio is about 0.5 to about 1.5, and a gel forms in from about 1 to about 15 days with the addition from about 0.25 to about 0.5 wt. % of sodium hydroxide.

* * * * *